United States Patent [19]

Carlén et al.

[11] Patent Number: 4,502,385

[45] Date of Patent: Mar. 5, 1985

[54] ARRANGEMENT FOR STABILIZING AN ECCENTRIC BEARING BUSH

[75] Inventors: Bo R. J. Carlén, Sollentuna; Sven A. Arwidsson, Dingle, both of Sweden

[73] Assignee: Solna Offset AB, Sollentuna, Sweden

[21] Appl. No.: 428,578

[22] Filed: Sep. 30, 1982

[30] Foreign Application Priority Data

Oct. 2, 1981 [SE] Sweden ............................ 8105831

[51] Int. Cl.³ .............................................. B41F 7/02
[52] U.S. Cl. ................................... 101/218; 101/182;
  101/185; 101/247; 101/139; 101/140; 384/255
[58] Field of Search ............... 101/217, 218, 247, 137,
  101/139, 140, 143, 144, 145, 177, 185, 182;
  106/247; 384/255

[56] References Cited

FOREIGN PATENT DOCUMENTS 2636555  5/1977  Fed. Rep. of Germany .
347206   5/1969  Sweden .
607065   5/1978  U.S.S.R. ............................... 384/255

Primary Examiner—Edgar S. Burr
Assistant Examiner—Moshe I. Cohen
Attorney, Agent, or Firm—Burns, Doane, Swecker and Mathis

[57] ABSTRACT

The present invention relates to an arrangement for eliminating the play or clearance between an eccentric bearing bush for a printing cylinder bearing and a bearing hole which rotatably accommodates the bush in the side frame of the printing press. Mutually contiguous surfaces of the bearing bush and the bearing hole are formed with contours which provide mutual contact between the surfaces along two areas which are substantially parallel to the bearing hole axis. The contact surfaces are separated by an angle of less than 180° defined by gaps between an outer surface of the bush and an inner surface of the bearing hole.

10 Claims, 3 Drawing Figures

ARRANGEMENT FOR STABILIZING AN ECCENTRIC BEARING BUSH

TECHNICAL FIELD

The invention relates to an arrangement for stabilizing an eccentric bearing bush for a printing cylinder bearing, in a bearing hole which rotatably receives the bush in a printing press side frame.

BACKGROUND ART

In printing presses, in order to bring the printing cylinders to and from their operating position, their bearings are mounted in eccentric rings, which in turn are rotatably mounted in the side frame of the press. In order to obtain good printing quality, it is required, inter alia, that the printing cylinders must be stabilized without play relative the side frames during operation of the press. However, a given clearance is required between the eccentric ring and the frame so that the ring can be turned when moving the cylinders to and from their operating position.

To eliminate this clearance it is known to deform either the hole wall in the press side frame or the eccentric ring.

DE Patent OS No. 26 36 555 discloses a three-point fixation of a bearing bush in a bore in a printing press side frame. Under the wall surface of the bore in the side frame there is an expansion chamber on either side of the resultant to the forces acting on the printing cylinder. By expansion of the chambers, the surfaces of the bore in the side frame which are contiguous to the chambers will expand and clamp the bush. A third support point for the bearing bush is established by the chamber walls lifting the bush on expansion into direct contact against the wall of the bore in the side frame.

The SE Patent No. 347,206 discloses a technique corresponding to DE OS No. 26 36 555, the expansion chambers being arranged in the eccentric bush for expansion of two areas of the outer cylindrical surface of the bush into contact with the wall of the bore in the side frame.

The U.S. Pat. No. 3,786,749 discloses an expansion chamber extending peripherally between said bore and an eccentric bush in a printing press.

The known arrangements for eliminating play between the eccentric ring and side frame in printing presses of the kind in question thus utilize deformation of the contiguous surfaces in question. Such deformation arrangements are expensive to produce. In the case where the deformation arrangements are of mechanical type, such as in an embodiment disclosed in DE OS No. 26 36 555, there are difficulties in guidance, and in the case of hydraulic expansion great hydraulic pressures are required, and there are substantial drawbacks in respect to establishing the hydraulic pressure. In the arrangement according to the U.S. patent, clamping of the bearing ring or bush will not be stable, since the expansion chamber is not stiff, due to the hydraulic fluid being able to move along the chamber even when under pressure. In the arrangements according to the German and the Swedish patents, the expansion chambers must be made stiff, since they shall withstand the contact pressure between the cylinders and prevent the bushes from rolling over the respective chambers.

The known art is thus complicated and expensive.

OBJECT

One object of the invention is to provide a stabilizing arrangement of the kind mentioned in the introduction, which offers in a simple way the elimination of the clearance between the bearing bush and the press side frame, without the need of expansion chambers contiguous to the mutually contiguous parts of the bearing bush and frame. Further objects of the invention will be apparent from the following description.

SUMMARY OF THE INVENTION

The inventive arrangement has its use in the elimination of play or clearance between an eccentric bearing bush for a printing cylinder bearing and a bearing hole which rotatably accomodates the bush in the side frame of a printing press, and is distinguished essentially in that the mutually contiguous surfaces of the bearing bush and bearing hole are formed with contours offering mutual contact between said surfaces along two areas substantially parallel to the bearing hole axis, said areas being separated in the peripheral direction. For natural reasons the contact surfaces are separated by an angle less than 180°. A force generator or motor may possibly be disposed between the bearing bush and frame in an area diametrically opposed to the contact area between bearing bush and the bearing hole wall in the frame.

The contact areas are preferably arranged to lie outside the area of movement, in the operating position of the printing cylinder, for the resultant to the forces normally acting on the printing cylinder during operation of the press.

It may be mentioned that the printing cylinders are provided with grooves (cylinder dikes) affording attachment of printing plates and rubber sheeting on the cylinders. When these grooves have passed the contact points between the cylinders, the interplay of forces between the cylinders is released so that a pendular force distribution occurs on the cylinder mounting, and thereby on the eccentric ring or bush during operation of the printing press. The resultant to the pressure forces acting on a printing cylinder moves within a given circle sector with relation to the axis of the bearing hole. This has been found to take up an angle which is less than 180° in a usual type of printing press. By arranging the cylinders in a given orientation relative each other it can be ensured that the action of gravity on the cylinder comes within said sector. It is therefore not absolutely necessary in a printing machine to arrange a motor between the bearing bush and frame. According to the invention, however, such a motor is preferred to ensure stable contact between the bearing bush and the bearing hole in the side frame for the bush, since there thus may be permitted a given imbalance in the cylinders and the free selection of mutual relative positions for the cylinders.

The motor is preferably a hydraulic cylinder formed by a radially directed bore in the frame or bush, there being a piston adapted in said bore for pressure against the outer cylindrical surface of the bush or the bearing hole wall of the frame, respectively, when the cylinder formed by the bore and piston is hydraulically pressurized. It should however be clear that such hydraulic cylinders may be replaced by other motors, known per se.

Hydraulic or pneumatic circuits with control means can be arranged to afford movement of the work cylinder to and from its operating position by rotation of the bearing bush in the bearing hole of the frame, and for energizing and de-energizing the motor. The circuits and control means are thereby suitably arranged so that the motor is energized after the cylinder has been brought into its operating position, and so that the motor is de-energized before the cylinder is caused to move from its operating position.

In a preferred embodiment of the invention the bearing hole of the frame is right circular cylindrical, and the outer curved surface of the bearing bush is right circular cylindrical along the greater part of its circumference. Along the remaining portion of its circumference the curved surface is disposed at a shorter distance from the central curvature for said larger circumferential portion, the contact areas being formed by the junctions between said circumferential portions of the bush. The circumferential portion with shorter distance from said centre is suitably established by the bearing bush first being produced conventionally with a right circular cylindrical curved surface, subsequent to which the curved surface is ground off in said circumferential area with a radius which is greater than that of the original one for the curved surface.

The junctions between said circumferential parts of the bush are preferably rounded-off.

The invention is defined in the appended claims.

DRAWING

FIG. 1 schematically illustrates a printing press including two coacting printing cylinders with associated form cylinders.

EMBODIMENT

Figure 1:
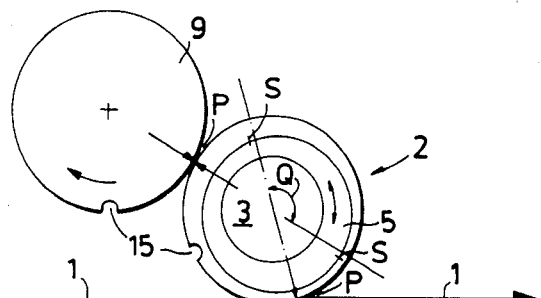

FIG. 1 illustrates two printing cylinders 2, the journalling stubs 3 of which are mounted in eccentric rings 5 via unillustrated bearings, said rings being in turn rotatably disposed in holes 7 (see FIG. 2) in the side frame of the press. The cylinders 2 coact with form cylinders 9 which are fixedly mounted in the side frames. The cylinders 2 and 9 have axial exterior grooves 15 for attaching rubber sheeting and printing plates.

By turning the eccentric rings 5 in the frame holes 7 the printing cylinders are taken to and from their operating position, in which the path of movement of the item for printing is indicated by the arrow 1.

In the operating position, the respective printing cylinder is acted on by forces P, coming from the contact with contiguous cylinders. When the grooves 15 pass the points of contact between the cylinders the effect of forces there is momentarily unloaded.

The resultant to the forces transferred from the ring 5 to the hole 7 will thus swing within the sector Q and tend to subject the ring 5 to a rolling motion in the bearing hole 7.

Figure 2:
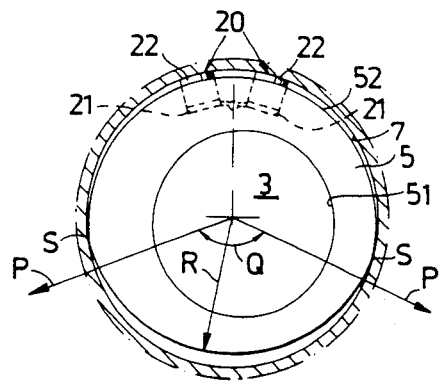
FIG. 2 illustrates the inventive journalling of a printing cylinder in the side frame of the press.

FIG. 2 illustrates an example of the inventive arrangement.

The eccentric ring 5 has a circular bore 51 for receiving the journalling stub 3 of the printing cylinder 2 via an unillustrated bearing. The outer surface 52 of the ring 5 is right circular cylindrical along the greater portion of its circumference. Along the remaining portion of its circumference the outer surface of the ring 5 has a reduced distance R from the radius or curvature for the chief centre of curvature of the surface 52. The junctions between the circumferential areas of the ring 52 form support ridges S, which rest against the circular wall of the frame hole 7. The junctions/support ridges S are preferably arranged so that they lie outside the sector of movement Q for the force resultant, the angular distance between the junctions S naturally having to be <180°.

The ring is thus oriented so that in the position of turning, where it has brought the printing cylinder into the working position, its support ridges S are on either side of the sector Q.

Two motors 20 are arranged in the ring 5. The motors 20 each comprise a radially outwardly open bore 21, in which a piston 22 is sealingly and displaceably mounted. The free end of the piston 22 has a contour corresponding to that of the bearing hole 7. At its bottom, the bore 21 communicates with a hydraulic pressure source for loading and unloading the piston 22.

The motor 20 serves to retain the eccentric ring 5 in no-play contact with the bearing hole 7, whereat, in the preferred disposition of the support ridges, the exercise of force by the motor 20 only need be large enough to overcome the forces tending to cause the support ridges S of the ring 5 to leave the contiguous wall of the bearing hole 7; namely the action of gravity on the cylinder mass (depending on the orientation of the ridges S) and inertial forces resulting from imbalance in the cylinders. The forces exerted by interplay between printing cylinders and form cylinders thus tend to stabilize the ring in the bearing hole, since the ring rests against the wall of the bearing hole 7 via the ridges S.

Figure 3:
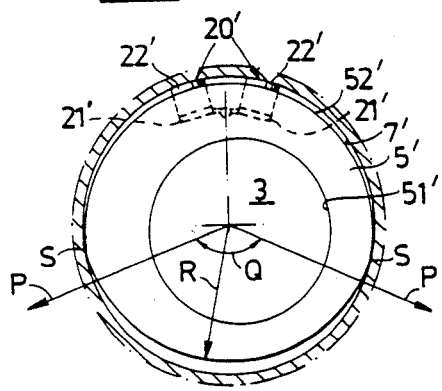
FIG. 3 illustrates an alternative journalling of a printing cylinder in the side frame of the press.

It will be understood that instead of grinding off a circumferential portion of the excentric ring 5 to form the support ridges S it is equally as conceivable to clear out the bearing hole 7, e.g. by grinding, in a corresponding area to form similar support ridges with corresponding effect. This arrangement is shown in FIG. 3 wherein like parts have been given the same reference numeral as indicated by the ' notation therewith. In this arrangement, the bearing hole is in the shape of a right cylinder surface along the greater part of its circumference with the remaining smaller part if the circumference being at a larger radial distance from the central curvature of the greater part of the circumference. The bush exterior is in the shape of a right circular cylinder.

It will be similarly understood that a single motor 20 is sufficient (instead of the two illustrated) and that the motor may be arranged in or on the side frame or its mounting arrangement for the ring 5, and that optional means which can exercise a separating force between two contiguous elements may be utilized as motors.

Turning the rings 5 to bring the cylinders to and from their operating positions can naturally be automated with the aid of means known per se. Similarly, loading and unloading of the motors 20 may be automated, and preferably controlled by the turning of the rings 5. These two operations should suitably be regulated such that the motors 20 are first energized after the ring 5 has been rotated so that the cylinder 2 has come into its operating position, and then de-energized before the ring 5 is rotated, so that the cylinder 2 can move from its operating position.

Accordinng to the invention the mutually contiguous surfaces of the bush and bearing hole are formed with certain contours. Thereby is meant that the contours shall be "fixed". Hereby the need for means for deformating one of the contours is avoided.

We claim:

1. An arrangement for stabilizing an eccentric bearing bush for a printing cylinder bearing, said bush rotatably positioned in a right circular cylinder bearing hole rotatably accommodating the bush in a side frame of a printing press, the bearing bush being a right circular cylindrical surface along the greater part of its circumference, the remaining smaller part of its circumference being at a shorter radial distance from the center of curvature of the larger circumferential portion, said bearing hole and said bearing bush thereby providing mutually contiguous surfaces of the bearing bush and bearing hole having contours which provide mutual contact between the surfaces along two areas substantially parallel to the axis of the bearing hole, the contact areas positioned outside the range of movement for a resultant to the forces normally acting on the printing cylinder during operation of the press, and with an angular distance to each other which is less than 180° degrees, said areas being separated in the circumferential direction by gaps between an outer surface of the bush and an inner surface of the bearing hole, said gaps separated in the circumferential direction by said two areas.

2. An arrangement as claimed in claim 1, wherein a motor is arranged between the bearing bush and the frame in an area diametrically opposed to the contact area defined between the bearing bush and the bearing hole of the frame.

3. An arrangement as claimed in claim 1, wherein the contact areas between said circumferential portions of the bush are rounded-off.

4. An arrangement as claimed in claim 3, wherein a motor is arranged between the bearing bush and the frame in an area diametrically opposed to the contact area defined between the bearing bush and the bearing hole of the frame.

5. An arrangement as claimed in claim 4 wherein the motor comprises a hydraulic cylinder defined by a radially directed bore in the bush, a piston received in said bore so as to press against the outer curve surface of the bush and the bearing hole wall of the frame, respectively, when the bore is put under hydraulic pressure.

6. An arrangement for stabilizing an eccentric bearing bush for a printing cylinder bearing, said bush having a right circular cylindrical surface rotatably positioned in a bearing hole accommodating the bush in a side frame of a printing press, the bearing hole being a right circular cylindrical surface along the greater part of its circumference, the remaining smaller part of its circumference being at a larger radial distance from the center of curvature of the larger circumferential portion, said bearing hole and said bearing bush thereby providing mutually contiguous surfaces of the bearing bush and bearing hole having contours which provide mutual contact between the surfaces along two areas substantially parallel to the axis of the bearing hole, the contact areas positioned outside the range of movement for a resultant to the forces normally acting on the printing cylinder during operation of the press, and with an angular distance to each other which in less than 180 degrees, said areas being separated in the circumferential direction by gaps between an outer surface of the bush and an inner surface of the bearing hole, said gaps separated in the circumferential direction by said two areas.

7. An arrangement as claimed in claim 6, wherein a motor is arranged between the bearing bush and the frame in an area diametrically opposed to the contact area defined between the bearing bush and the bearing hole of the frame.

8. An arrangement as claimed in claim 6 wherein the contact areas between said circumferential portions of the bush are rounded-off.

9. An arrangement as claimed in claim 8 wherein a motor is arranged between the bearing bush and the frame in an area diametrically opposed to the contact area defined between the bearing bush and the bearing hole of the frame.

10. An arrangement as claimed in claim 9, wherein the motor comprises a hydraulic cylinder defined by a radially directed bore in the bush, a piston received in said bore so as to press against the outer curve surface of the bush and the bearing hole wall of the frame, respectively, when the bore is put under hydraulic pressure.

* * * * *